Feb. 5, 1963 A. KOSTYRKA 3,076,662
CHUCK

Filed March 7, 1962 5 Sheets-Sheet 1

Inventor:
Alfred Kostyrka
by:
Michael S. Striker
Attorney

Feb. 5, 1963  A. KOSTYRKA  3,076,662
CHUCK
Filed March 7, 1962  5 Sheets-Sheet 3

Inventor:
Alfred Kostyrka
by:
Michael S. Striker
Attorney

Feb. 5, 1963

A. KOSTYRKA

3,076,662

CHUCK

Filed March 7, 1962

Inventor:

Feb. 5, 1963  A. KOSTYRKA  3,076,662
CHUCK

Filed March 7, 1962  5 Sheets-Sheet 5

Inventor:
Alfred Kostyrka by: Michael J. Striker
Atty

United States Patent Office 3,076,662
Patented Feb. 5, 1963

3,076,662
CHUCK
Alfred Kostyrka, Gustav-Siegle-Strasse 16,
Stuttgart, Germany
Filed Mar. 7, 1962, Ser. No. 178,786
Claims priority, application Germany Mar. 10, 1961
19 Claims. (Cl. 279—4)

The present invention relates to machine tools.

More particularly, the present invention relates to chucks adapted to be used with machine tools for holding and rotating the work.

At the present time, when the work is axially aligned with the chuck, it is necessary for the operator to move, in a manual manner, the jaws of the chuck into engagement with the work in order to grip and hold the latter so that the work can be turned relative to a cutting tool. Not only is this conventional procedure inconvenient and time-consuming because of the manual operations involved, but in addition it is necessary for the operator to turn the chuck and the work on the machine tool during adjustment of the pressure with which the several jaws of the chuck engage the work, and this is an operation which is tedious and must be performed with considerable skill and precision in order to guarantee at least approximately uniform pressure of the several jaws with respect to the work so as to reliably hold the latter coaxially with the rotary chuck and securely with respect thereto in order to enable the work to be rotated about its axis.

One of the primary objects of the present invention is to provide a chuck which will overcome the above drawbacks by providing an automatic movement of the gripping jaws of the chuck into engagement with the work piece to hold the latter.

Another object of the present invention is to provide a chuck which will not only automatically move the jaws into engagement with the work, but which will in addition automatically provide equal pressure of the several jaws on the work.

A further object of the present invention is to provide a chuck of the above type which will automatically grip the work with jaws which will have uniform pressure with respect to the work even if the workpiece is of an irregular, non-circular cross section necessitating different distances of the jaws with respect to the axis of the work and the clutch.

It is a further object of the present invention to provide a chuck of the above type which enables the pressure with which the jaws grip the work to be adjusted.

Still another object of the present invention is to provide a chuck of the above type which has a head which is shiftable rearwardly during automatic engagement of the work by the jaws of the chuck, and which will at the same time guarantee, by a suitable indicating means, that all of the successive workpieces have the same axial position, along the axis of the chuck when gripped by the latter, so that uniform operations on a plurality of identical workpieces of a given job is guaranteed.

It is also among the objects of the present invention to provide a chuck which is particularly adapted to cooperate with work which is supported between a pair of centers and which moreover is particularly suited for mass production where the operator need only place the work on the centers and then shift the tailstock toward the headstock, in order to complete all of the manual operations, the automatic operations then proceeding without any further attention on the part of the operator.

It is furthermore an object of the present invention to provide structure capable of accomplishing the above objects and at the same time composed of an assembly of relatively simple rugged elements which are very reliable in operation and which will have a long life of maintenence-free use.

With the above objects in view, the invention includes, in a chuck, a support means which is adapted to be fixed to a rotary part of a headstock to be rotated thereby. A head of the chuck is located in front of the support means coaxially therewith, and the support means of the chuck of the invention supports the head for axial shifting movement relative to the support means while constraining the head to rotate with the support means, when the latter rotates with the rotary part of the headstock. A plurality of gripping jaws are distributed about the common axis of the support means and head, and a plurality of piston-and-cylinder means are carried by the head and respectively carry the jaws for moving the latter radially toward and away from the common axis of the support means and head. A hydraulic means is carried by the head, communicates with the several piston-and-cylinder means, and responds to rearward shifting movement of the head toward the support means for actuating the plurality of piston-and-cylinder means to move the jaws radially toward the common axis of the support means and head so as to grip a workpiece automatically when the latter is placed against the head and shifts the latter rearwardly with respect to the support means.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

Figure 1:
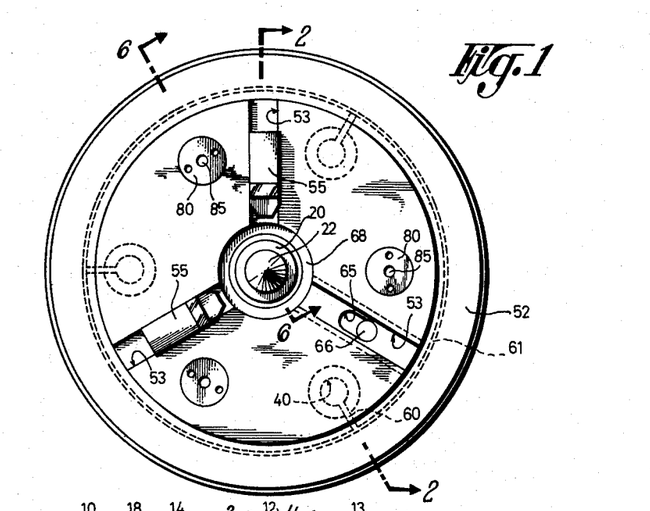
FIG. 1 shows in a front elevation one embodiment of a chuck according to the present invention.
Figure 2:
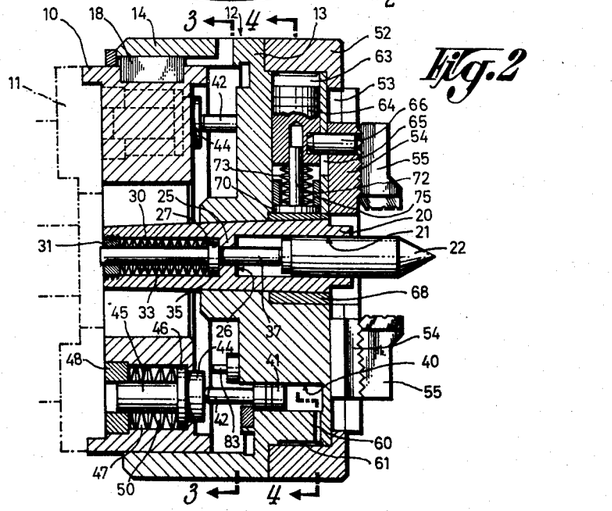
FIG. 2 is a transverse sectional view of a chuck of FIG. 1 taken along the line 2—2 of FIG. 1 in the direction of the arrows.

The embodiment of the chuck of the invention which is illustrated in FIGS. 1–7 includes a support means 10 in the form of a ring which is fixedly connected to any suitable rotary part of the headstock of a machine tool such as the annular part 11 shown in dot-dash lines in FIG. 2, this rotary part 11 of the headstock being driven in a well known manner when the machine tool, such as a lathe, for example, is driven and of course the annular support means 10 which is fixed by suitable bolts or the like to the part 11 is coaxial with the latter so that the parts 10 and 11 will rotate about their common axis when the machine tool is operated. In front of the support means 10 of the chuck of the invention is located a shiftable head 12 which is coaxial with the support means 10. The shiftable head 12 has a portion 13 which carries, among other elements of the chuck, a rearwardly extending annular flange 14 which is integral with the head 12 and which coaxially surrounds is slidable with respect to the support means 10. The support means 10 fixedly carries an elongated key 18, shown at the upper part of FIG. 2, this key 18 extending parallel to the common axis of the support means 10 and shiftable head 12, and the flange 14 of the head 12 is formed with an axial groove receiving the key 18, so that in this way the support means 10 supports the shiftable head 12 for axial shifting movement relative to the support means 10 while constraining the head 12 to rotate with the support means 10 when the machine tool is operated.

In the particular example illustrated, the portion 13 of the shiftable head 12 is formed with a central frustoconical bore which receives, with a press fit, a frustoconical insert 20 which is formed with an axial bore 21 receiving a center 22 which is coaxial with the head 12 and which is axially shiftable relative thereto within the bore 21 of the insert 20 which is fixed to the portion 13 of the clutch head 12. The insert 20 carries intermediate its ends an axially bored transverse partition 25 having a front face 26 and a rear face 27. To the rear of the partition 25 the insert 20 is formed with an axial bore 30 which threadedly receives at its rear end a plug 31 which is also axially bored. An assembly of dished springs 33 is located within the bore 30, and the series of dished springs 33 are all formed with coaxial central apertures, the series of springs 33 forming an elongated spring means which at its rear end bears against the plug 31 and which at its front end bears against a collar 35 which is fixed to an elongated rod 37 which passes freely through the central bore of the partition 25 and the central bore of the plug 31 so that this rod 37 is coaxial with the head 12, is axially slidable with respect thereto, and in its rest position is located by the spring means 33 in the illustrated position where the collar 35 which is fixed to the rod 37, as by being formed integrally therewith, engages the partition 25. The front end of the rod 37 engages the rear end of the center 22, so that in this way the spring means 33 urges the center 22 forwardly to the position illustrated in FIG. 2 where the center 22 projects forwardly beyond the head 12, and in this way the front end of the center 22 is rendered easily accessible to be engaged by an end of a workpiece.

Figure 4:
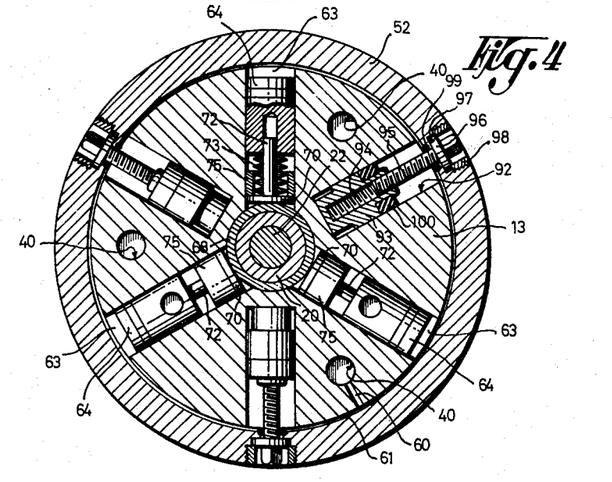
FIG. 4 is a transverse sectional view of the chuck of FIGS. 1 and 2, taken along line 4—4 of FIG. 2 in the direction of the arrows.

The portion 13 of the head 12 is formed with a plurality of bores 40 which are parallel to and distributed about the axis of the head 12, and in the illustrated example there are three bores 40 angularly spaced from each other by 120°, as is shown most clearly in FIG. 4. These bores 40 form cylinders of a hydraulic means which is carried by the head 12, and this hydraulic means include a plurality of pistons 41 which are axially slidable within the cyliniders 40. The pistons 41 respectively include rearwardly extending piston rods 42, and the several piston rods 42 respectively engage at their rear ends the head ends 44 of a plurality of pins 45 which are distributed also about the axis of the head 12, which are parallel to this axis, and which are guided by the support means 10 for shifting movement relative to the common axis of the support means 10 and the head 12. The pins 45 form part of an energy-storing or spring means which include in addition to the pins 45 a series of centrally apertured, dished springs 50 arranged within each bore 47 of the support means 10, the several bores 47 respectively receiving the pins 45, and the several pins 45 fixedly carry collars 46 which respectively engage flanges at the front ends of the bores 47 to limit the forward movement of the pins 45 which are respectively aligned coaxially with the piston rods 42. A plurality of rings 48 are fixedly carried by the support means 10 at the rear ends of the bores 47, respectively, and these rings 48 participate in the support of the pins 45 for axial shifting movement. The series of springs 50 in each bore 47 engage at their rear end the ring 48 and at their front end the collar 46, which is slidable in bore 47, so that the spring means 50 urges the pin 45 forwardly to the position illustrated at the lower part of FIG. 2. The energy-storing or spring means 44—50 resists rearward movement of the head 12 relative to the support means 10 and cooperates with the hydraulic means for determining the pressure thereof in a manner described below.

Figure 5:
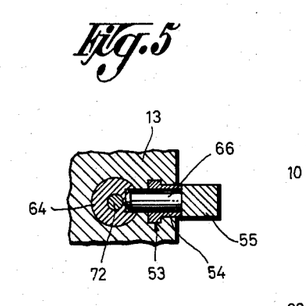
FIG. 5 is a fragmentary sectional view taken along line 5—5 of FIG. 7 in the direction of the arrows and showing the manner in which a gripping jaw is connected to a piston-and-cylinder means which moves the gripping jaw.

The portion 13 of the head 12 is formed with a shoulder at its forward outer portion, and this shoulder fixedly carries a covering ring 52. The portion 13 is also formed, at its front face, with a plurality of radial T-slots which form the guiding grooves 53 which respectively receive the jaw-carriers 54 which are radially slidable in the T-grooves 53 toward and away from the axis of the head 12 (FIG. 5). A plurality of jaws 55 are respectively fixed to the radially movable carriers 54, and in the illustrated example there are three jaws 55 as well as three carriers 54 respectively fixedly carrying the jaws 55 and respectively radially slidable in the T-slots 53 toward and away from the axis of the head 12, as is particular apparent from FIG. 1.

The shoulder of the head portion 13 which fixedly carries the covering ring 52 is formed with an annular groove 61 which forms part of the hydraulic means, and it is this groove 61 which is closed in a fluid-tight manner by the ring 52. As is shown at the lower part of FIG. 2, each cylinder 40 of the hydraulic means communicates through a radial bore 60 with the annular groove 61. The groove 61 also communicates with a plurality of radial bores 63 formed in the portion 13 of the head 12, and these bores 63 form parts of a plurality of piston-and-cylinder means which are respectively fixed to the gripping jaws 55, at least indirectly, for moving these jaws 55 radially toward and away from the axis of the head 12 when the hydraulic means actuates the plurality of piston-and-cylinder means. This plurality of piston-and-cylinder means includes in addition to the cylinder 63 a plurality of pistons 64 which respectively are slidable within the cylinders 63, and each piston 64 fixedly carries a pin 66 which extends parallel to the axis of the head 12 through a slot 65 formed in a portion of the part 13 of the head 12 and extending radially toward the axis of the head 12, as is shown particularly in FIG. 1. The several pins 66 which are thus fixed to the several cylinders 64, respectively, are also fixed to the jaw carriers 54, respectively, as by extending into bores of the latter, and in this way the several jaws 55 will move radially toward and away from the axis of the head 12 during movement of the several pistons 64 resepectively in the cylinders 63.

The illustrated example includes, of course, three cylinders 63, and these cylinders are closed at their inner ends by a ring 68 which surrounds and engages the insert 20. Within each cylinder 63 is located the head end 70 of an elongated pin 72, this head end 70 engaging the ring 68 and the pin 72 extending along the axis of the cylinder 63 into a bore of the piston 64, as shown at the upper portion of FIG. 2. In this way the several pins 72 serve to guide the several pistons 64, respectively. A series of centrally apertured dished springs 73 are arranged along and surround each pin 72 and form a spring means urging the several pistons 64 outwardly away from the axis of the head 12, each spring means 73 bearing at one end against the head 70 of the pin 72 and at its opposite end against the piston 64. A spacer sleeve 75 is located on each head 70 coaxially surrounding the pin 72 and some of the springs 73, as shown in FIG. 2, and the several sleeves 75 limit the movement of the several pistons 64, and the gripping jaws 55 therewith, toward the axis of the head 12.

Figure 3:
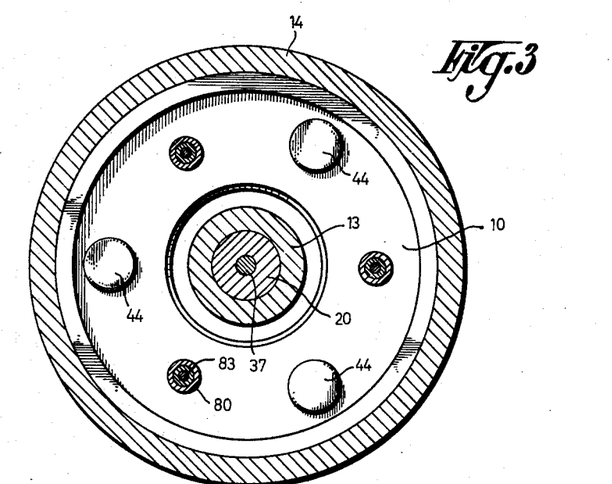
FIG. 3 is a sectional view of the chuck of FIGS. 1 and 2, taken along line 3—3 of FIG. 2 in the direction of the arrows.
Figure 6:
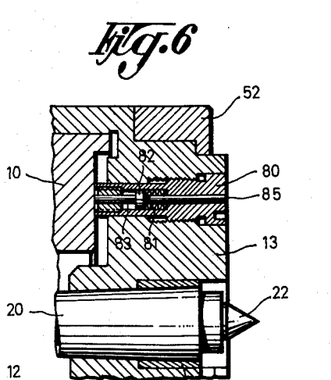
FIG. 6 is a sectional view of the chuck of FIG. 1 taken along line 6—6 of FIG. 1 in the direction of the arrows.

A stop means is provided to limit the rearward shifting movement of the head 12 relative to the support means 10, and this stop means includes, in the illustrated example, one or more elongated threaded members 80, as shown in FIGS. 3 and 6, which extend through axial bores, respectively, formed in the portion 13 of the head 12, and which threadedly engage the portion 13 of the head 12 in these bores thereof, as is particularly apparent from FIG. 6. As a result of this threaded connection between the elongated stop members 80 and the head 12 it is possible to adjust the positions of the stop members 80 and thus adjust the extent to which the head 12 is shiftable rearwardly. In the illustrated example there are three stop members 80 uniformly distributed about the axis of the head 12, although one stop means 80 will suffice. The head 12 is shown at the end of its rearward movement with respect to the support means 10 in FIG. 6, and it is apparent that the front face of the support means 10 forms also part of the stop means since it is this front face which engages the rear end of each stop member 80 to limit the rearward movement of the head 12 relative to the support means 10.

An indicating means is provided for indicating to the operator when the shiftable head 12 has reached the end of its rearward movement relative to the support means 10, and this indicating means includes an indicating pin 83 carried by each stop member 80 in an axial bore thereof. Each indicating pin 83 fixedly carries between its ends a collar 82 which is axially shiftable in a bore formed in the elongated stop member 80, this bore being closed at its rear end by a threaded plug, as shown in FIG. 6, which is also axially bored so that the indicating pin 83 also extends slidably through this plug. Forwardly of the collar 82 a series of dished springs 81 surrounds the pin 83, engages the front face of the collar 82, and engages the front end of the bore in which the collar 82 is slidable, so that the springs 81 form a spring means urging the pin 83 rearwardly until its collar 82 engages the plug which is threadedly carried by the stop member 80. In the rearmost position of the head 12, shown in FIG. 6, the front indicating end 85 of each indicating pin 83 will be visible at the front face of the stop member 80, by being flush with this front face when the head 12 is in its rear end position, so that when the operator sees that the indicating ends 85 of the pins 83 are flush with the front faces of the stop members 80, the operator will know that the head 12 has reached the end of its rearward movement relative to the support means 10. In the forward rest position of the head 12 the several indicating pins 83 respectively extend rearwardly beyond the stop members 80, as indicated at the lower portion of FIG. 2.

As is apparent from FIG. 4, the annular groove 61, in addition to communicating with the several cylinders 63 of the hydraulic means, also communicates with a plurality of cylinders 92 of the hydraulic means, these cylinders 92 being formed by bores of the portion 13 which are uniformly distributed about the axis of the head 12 and which extend radially toward this axis, as is apparent from FIG. 4. In the illustrated example there are three cylinders 92 forming part of the hydraulic means and respectively receiving pistons 93 of the hydraulic means. As apparent from FIG. 4, each of the pistons 94 is formed with a threaded axial bore which threadedly receives a screw 95. Each screw 95 fixedly carries a collar 96 which is located between a shoulder 97 of a bore passing through the covering ring 52 and a threaded ring 98 threaded into this bore, so that in this way while each screw 95 can be turned it cannot move along its axis. Beyond the collar 96 each screw 95 carries a non-circular free end portion adapted to receive a suitable wrench enabling the operator to turn the screw 95 which by threaded cooperation with the bore 94 will be capable of axially positioning the piston 93 within the cylinder 92. Each screw 95 is surrounded by a sealing ring 99 which provides fluid-tight turning of each screw 95 so that hydraulic fluid cannot leak outwardly beyond the sealing ring 99, and each piston 93 carries a sealing ring 100 which prevents leakage of the hydraulic fluid in the cylinder 92 radially past the piston 93 toward the axis of the shiftable head 12, so that in this way the hydraulic fluid in the annular groove 61 can flow in each cylinder 92 only up to the sealing ring 100 and of course cannot flow out beyond the sealing ring 99 of each screw 95.

The parts of the chuck of the invention are shown in their rest position in FIGS. 1-4. In rest position, as shown in FIG. 2, the spring means 33 maintains the center 22 in its position extending forwardly beyond the head 12. Moreover, in this rest position of the parts, the spring means 50 maintains the pins 45 in their forward positions where the flanges 46 engage the flanges at the front ends of the bores 47, and thus the several spring or energy-storing means will maintain the pistons 41, in the rest position of the parts, in the positions indicated in FIG. 2. Also, in the rest position of the parts, the spring means 73 maintain the pistons 64 in their rest positions relatively distant from the axis of the head 12, so that the gripping jaws 55 are in their outwardlly retracted positions spaced relatively distant from the center 22 enabling the end of a workpiece to be situated in the space between the gripping jaws 65.

The hydraulic means includes the portions of the cylinders 63 which are located outwardly beyond the pistons 64, respectively, the portions of the cylinders 92 which are located outwardly beyond the sealing rings 100, the annular groove 61, the several bores 60 and the portions of the cylinders 40 which are located forwardly beyond the piston 41, and all of these spaces in the shiftable head 12 communicate with each other and are filled with a hydraulic liquid, and it is apparent that this hydraulic system is closed so that shifting of some of the parts thereof so as to change the volume of a cylinder, for example, will result in movement of other parts thereof.

Figure 7:
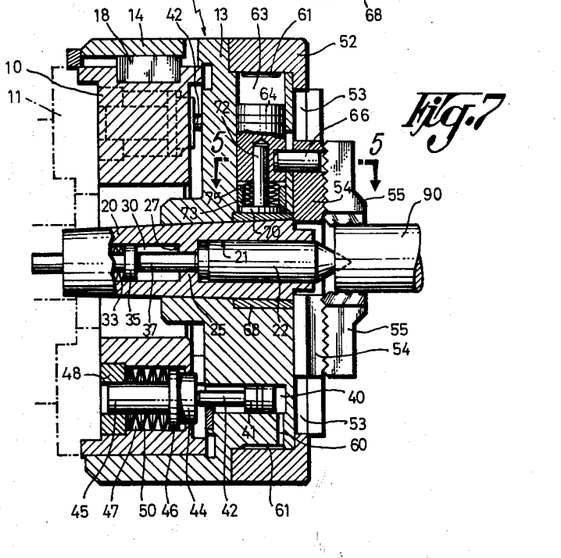
FIG. 7 shows the parts which are illustrated in FIG. 2 in the position which these parts take after the shiftable head of the chuck has been shifted rearwardly to advance the gripping jaws toward the axis of the chuck in order to grip a workpiece.

When using the clutch of the invention, a workpiece, such as the workpiece 90 shown in FIG. 7, is placed between the centers of the headstock and unillustrated tailstock. Thus, one end of the workpiece will engage the center 22 and the other end will engage the center of the tailstock, and the operator will then move the tailstock toward the headstock in a conventional manner. The result of this movement of the tailstock toward the headstock, with the workpiece engaging both centers, results in rearward shifting of the center 22 in opposition to the spring means 33 until the rearward end of the center 22 engages the partition 25, as shown in FIG. 7. When the rear end of the center 22 engages the partition 25, the continued movement of the tailstock toward the headstock will result in rearward shifting of the head 12 toward the support means 10 along their common axis. This rearward movement of the head 12 will continue until the rear ends of the stop members 80 engage the front face of the support means 10. During the rearward movement of the head 12 the piston rods 42 of the several pistons 41 of the hydraulic means press against the pins 45, respectively, of the energy-storing or spring means, and in this way the energy-storing means opposes rearward movement of the piston 41 so as to provide rearward movement of the head 12 relative to the pistons 41, and thus the volumes of the several cylinders 40 will diminish during rearward movement of the head 12. Thus, the springs 50 oppose rearward movement of the head 12 and act through the pins 45 on the pistons 41 to increase the pressure of the hydraulic liquid of the hydraulic means. The pressure for all of the pistons 41 is equal since the closed hydraulic system equalizes the pressure acting on all of the pistons 41, and it will be noted from FIGS. 7 that by the time the head 12 reaches its rear position the springs 50 have been compressed and the pins 45 have been displaced rearwardly from their positions shown in FIG. 2.

The rearward movement of the cylinders 40 relative to the pistons 41 displaces hydraulic fluid from the cylinders 40 into the cylinders 63 so as to shift the several pistons 64, in opposition to the springs 73, which are substantially weaker than the springs 50, toward the axis of the head 12, and the radial movement of the pistons 64 toward this axis will of course result in radial movement of the jaws 55 into engagement with the workpiece 90 so as to tightly grip the latter, as shown in FIG. 7. The hydraulic system also provides an automatic equalization of the pressure of the hydraulic fluid acting on the pistons 64, so that even non-circular workpieces will be securely gripped. The several spring means 73 are relatively weak and are required only to be strong enough to move the pistons 64 to their rest positions shown in FIG. 2 when the head 12 is located in its forward rest position, so that even though the several series of springs 73 are compressed to different degrees in the case of a non-circular workpiece, the difference between the forces of the several series of springs 73 is so slight that substantially equal pressures act on the several pistons 64.

The purpose of the pistons 93 is to roughly locate the jaws 55 in predetermined positions when the head 12 is in its rest position so that the jaws 55 need not move through relatively large distances before engaging a workpiece. Thus, before a work piece is placed in engagement with the center 22, the operator can turn the several screws 95 so as to displace hydraulic liquid out of the cylinders 92 into the cylinders 63 for roughly locating the jaws 55, by corresponding displacement of the pistons 64, respectively, in positions where they will be relatively close to the exterior surface of the workpiece when the latter is initially placed in the space between the jaws 55, and as a result the jaws 55 will engage the workpiece during the initial part of the rearward movement of the head 12, so that the remainder of the rearward movement of the head 12 will result in compression of the springs 50 to provide a sufficient gripping force of the jaws 55 on the workpiece to securely hold and drive the latter. It is to be noted that the springs 33 are also substantially weaker than the springs 50, these springs 33 only being sufficiently strong to return the center 22 to the position illustrated when the head 12 is in its rest position, so that the rear end of the center 22 engages the partition 25 before any rearward movement of the head 12 can take place.

As is apparent from FIG. 6, during the rearward movement of the head 12 the indicating pins 83 will engage the front face of the support means 10 so that the several stop members 80 will move rearwardly with respect to the indicating pins 83. The length of each pin 83 is equal to the length of the stop member 80 so that when the stop member 80 engages the stop surface formed by the front face of the support means 10 the indicating end 85 of the pin 83 will be flush with the front face of the stop member 80, as shown in FIG. 6. It will be noted from a comparison of FIGS. 6 and 7 that when the stop members 80 engage the front face of the support means 10 the pistons 64 have not yet engaged the sleeve 75. The purpose of the indicating pins 83 is to indicate to the operator when the head 12 reaches its rearmost operating position, and in this way the operator will know that all of the successive workpieces have identical positions along the axis of the chuck, so that identical operations will be performed on the successive workpieces. The engagement of the stop members 80 with the support means 10 limits the rearward movement of the head 12 and thus limits the rearward movement of the cylinders 40 relative to the pistons 41, so that when the stop members 80 engage the support means 10 the pistons 64 cannot be displaced further toward the axis of the chuck.

When the tailstock is moved away from the headstock so as to release the workpiece, the parts will of course automatically return to their rest position shown most clearly in FIG. 2. The springs 50 will expand so as to place the pins 45 in the positions shown in FIG. 2, and of course this will also determine the rest positions of the pistons 41. Moreover, the springs 73 will expand until the pins 66 reach the outer ends of the slots 65, respectively, and this will result in the displacing of fluid out of the cylinders 63 into the cylinders 40 for moving the head 12 forwardly with respect to the pistons 41, and of course the springs 81 (FIG. 6) will also act to contribute to the forward movement of the head 12 to its rest position. In this way the structure also operates automatically to release the workpiece.

Figure 8:
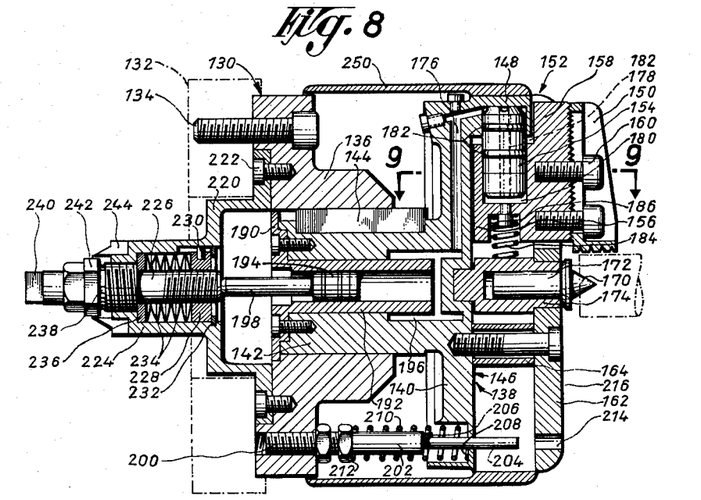
FIG. 8 is an axial sectional illustration of another embodiment of a chuck according to the present invention.

In the embodiment of the invention which is illustrated in FIG. 8, there is also an annular support means 130 which is adapted to be releasably fixed by bolts 134 to a rotary part 132 of the headstock of the machine tool so that the support means 130 will rotate with the part 132 when the machine tool operates. The support means 130 is provided with a forwardly extending cylindrical projection 136 formed with a central cylindrical bore which slidably receives a rearward cylindrical extension 142 of the portion 130 of the shiftable head 138 of the clutch of FIG. 8. The cylindrical rear extension 142 of the head 138 fixedly carries a key 144 which extends parallel to the common axis of the support means 130 and the shiftable head 138, and the key 144 is received in a keyway formed at the inner periphery of the support means 130, so that in this way the support means 130 supports the shiftable head 138 for axial shifting movement relative to the support means 130 while constraining the head 138 to rotate with the support means 130 during the operation of the machine tool.

In order to connect the gripping jaws to the head 138, the head 138 is provided with three forwardly extending projections 148 extending forwardly from the front face 146 of the head 138, and these three projections 148 are uniformly distributed about the axis of the head, so that the projections 148 are spaced 120° from each other. Three gripping jaws 150 are respectively connected to the projections 148 by way of three-piston-and-cylinder means 152. Each piston-and-cylinder means 152 includes a piston 154 which is fixed to a projection 148 and extends therefrom radially toward the axis of the head 138. Three cylinder blocks 156 are respectively formed with cylindrical bores which slidably receive the several pistons 154. The cylinder blocks 156 have portions 158 which respectively extend forwardly beyond the projections 148 and which receive the screws 160 which serve to fix the jaws 150 respectively to the jaw-carrier portions 158. The heads of the screws 160 are located in grooves of the jaws 150, while the shanks of the screws 160 extend through slots of the jaws 150 into threaded bores of the portion 158 of each cylinder block, so that in this way the position of the several jaws 150 with respect to their carrier portions 158 can be radially adjusted. It should be noted that the jaws 55 may be adjustably fixed in the same way to the jaw-carriers 54, respectively. A front plate 162 is fixed by suitable screws to the head 138, and suitable spacer sleeves 164 are inserted between the front face 146 of the head 138 and the rear face of the plate 162 so as to determine the distance of the plate 162 from the face 146. The plate 162 is formed with three radial elongated notches 166 extending inwardly from its outer periphery, and these notches are uniformly distributed about the axis of the head 138 and respectively receive the portions 168 of the cylinder blocks 156, as shown most clearly in FIG. 9, these cylinder blocks being formed at their outer side faces with grooves which receive the edge portions of the plate 162 which define the notches 166, so that in this way the plate 162 serves to guide the several cylinder blocks 156 for radial movement toward and away from the axis of the head 138.

A bore formed centrally in the front face 146 of the head 138 and a central bore passing through the plate 162 receive portions of an insert 174 extending between the front face and the plate 162, and the insert 174 is itself formed with an axial bore which receives the shank 172 of the center 170. It will be noted that in this embodiment there is no spring which urges the cylinder 170 forwardly. Of course, whenever the operator desires it it a simple matter to remove one center 170 and replace it by a different center.

Figure 9:
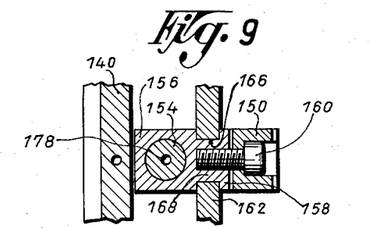
FIG. 9 is a fragmentary sectional view taken along line 9—9 of FIG. 8 in the direction of the arrows and illustrating the manner in which a gripping jaw is connected to a piston-and-cylinder means of the embodiment of FIG. 8.

The hydraulic means of the embodiment of FIGS. 8 and 9 includes three radial bores 176 formed in the head 138 and communicating through the spaces in the projections 148 which respectively receive the pistons 154 with axial bores 178 respectively passing through the pistons 154, so that in this way hydraulic liquid in the radial bores 176 can flow through the axial bores 178 of the pistons 154 into the interior chambers 180 of the cylinders of the cylinder blocks 156, respectively. The cylinder blocks 156 will advance toward the axis of the chuck in order to grip a workpiece with the jaws 150 in response to rearward movement of the head 138 relative to the support means 130, and this is brought about by displacing hydraulic liquid, in a manner described below, into the chambers 180 so as to increase the volume of these chambers, and each of the pistons 154 carries a pair of sealing rings 182 which prevents any leakage of the oil or other hydraulic liquid. When the tailstock is moved away from the headstock so as to release a workpiece, the several cylinder blocks 156 are shifted outwardly away from the axis of the head 138 to their rest positions by springs 184, respectively, which respectively extend between the insert 174 and the several cylinder blocks 156, as indicated at the upper position of FIG. 8. The several springs 184 respectively extend into bores 186 formed in those end faces of the blocks 156 which are directed toward the axis of the chuck, and the springs bear against the inner ends of these bores as well as against the exterior face of the insert 174 so that these springs 184 constantly urge the cylinder blocks 156 outwardly.

It will be noted that the elongated cylindrical portion 142 of the shiftable head 138 is formed with an axial bore, and this axial bore receives a cylinder 192 of the hydraulic means of the embodiment of FIG. 8, this cylinder 192 being integral with a flange 190 which is fixed to the portion 142 of the shiftable head 138, as by being formed integrally with the flange 190. The hydraulic means includes in addition to the cylinder 192, a piston 194 located within the cylinder 192 and with respect to which the cylinder 192 is slidable, and of course the piston 194 can also slide with respect to the cylinder 192. It will be noted that the outer periphery of the flange 190 engages, in the rest position of the parts shown in FIG. 8, a shoulder of the support means 136, so that in this way the flange 190 cooperates with the support means 136 to limit the axial movement of the head 138 away from the support means 136. The front end of the cylinder 192 extends into a hollow interior chamber 196 of the shiftable head 138, this chamber 196 being filled with a hydraulic fluid such as oil, and of course the several radial bores 176 cooperate with the chamber 196 so that the oil or the like can flow from the chamber 196 through the several bores 176 respectively to the several piston-and-cylinder means 152 which respectively actuate the gripping jaws. The piston 194 fixedly carries a rearwardly extending piston rod 198 which engages against the energy-storing or spring means of the embodiment of FIG. 8, this energy-storing or spring means resisting the rearward movement of the piston 194 with the head 138 when the latter is shifted rearwardly toward the support means 136, so that during such shifting movement of the head 138 the oil or other hydraulic liquid will be compressed and will be delivered with the necessary pressure to the several chambers 180 so as to automatically move the gripping jaws into engagement with the workpiece when the latter engages the center 172 and shifts the head 138 rearwardly toward the support means 130 when the center of the tailstock is moved toward the headstock, as described above and as is well known in the art. With the chuck of the invention a stop means is provided to limit the rearward movement of the shiftable head 138 toward the support means 130, and in the embodiment of FIG. 8 the stop means includes at least one elongated stop member 202, shown at the lower part of FIG. 8, and having a threaded portion 200 extending into a threaded bore of the support means 130 so that the latter fixedly carries the stop means 202. The stop means 202 has an elongated front portion 204 of reduced diameter which forms an indicating means for indicating to the operator when the shiftable head has reached its rear end position. At the rear end of the indicating means 204, the stop means 202 is provided with a forwardly directed shoulder 206 which is engaged by a surface portion 208 of the shiftable head 138, at the portion 140 thereof, so that by engagement of surface 208 and shoulder 206 the rearward shifting movement of the head 138 relative to the support means 130 is limited. The head 138 is urged forwardly by a spring 210 which is coiled about the stop means 202, which engages with its rear end a nut 212 carried by the stop means 202, and which engages with its forward end the rearwardly directed surface 208. Thus, the spring 210 urges the head 138 forwardly to the position illustrated in FIG. 8. When the tailstock is moved away from the headstock so as to release a workpiece, the spring 210 will expand so as to move the head 138 forwardly to the position shown in FIG. 8, and this will of course provide a relative movement between the cylinder 192 and the piston 194 which will increase the volume of hydraulic liquid in the cylinder 192, so that the springs 184 can expand and move the jaw-carriers 158 away from the axis of the chuck so that in this way the gripping jaws 150 will move away from the workpiece to release the latter. The plate 162 is formed with an opening 214 which is coaxial with the indicating means 204, and the axial position of the stop means 202 is such that when the surface 208 engages the shoulder 206 the front end of the indicating means 204 is flush with the front surface 216 of the plate 162, so that in this way the operator will know that the shiftable head has reached its rear end position. In this way the operator knows when the workpiece is securely ripped by the chuck. Of course, due to the threaded connection between the stop means 202 and the support means 130, the axial position of the stop means 202 can be adjusted so as to regulate the extent to which the head 138 will move rearwardly, and it will be noted that at all of the adjusted positions of the stop means 202 the surface 208 will engage the shoulder 206, and the length of the indicating means 204 is equal to the distance between the surface 208 and the front face 216 of the plate 162, so that irrespective of the adjustment of the stop means 202 the front end of the indicating means 204 will always be flush with the front face 216 of the plate 162, so that the operator will have an indication of when the shiftable head reaches its rear end position irrespective of the adjustment of the stop means 202.

The energy-storing or spring means of the embodiment of FIG. 8 is adjustable so as to adjust the hydraulic pressure which acts on the gripping jaws, and this energy-storing or spring means includes the elongated tubular housing 220 which is fixed by the screws 222 to the support means 130 and extends rearwardly from the support means 130 coaxially therewith. The housing 220 includes a rearwardly extending tubular portion 224 through which an elongated screw 226 coaxially passes, and it is the front end of the screw 226 which is engaged by the rear end of the piston rod 198. During rearward movement of the head 138 the energy-storing means will resist rearward movement of the piston 194 until a certain hydraulic pressure is reached, and then the screw 226 will also move rearwardly yielding to the hydraulic pressure. Thus, when a predetermined hydraulic pressure is reached the energy-storing or spring means will yield so as to maintain this hydraulic pressure during the continued rearward movement of the head 138 to the limit provided by the adjustable stop means. The screw 226 threadedly engages a threaded bore of a member 228 which is axially shiftable within the tubular portion 224. The member 228 fixedly carries a pin 230 which projects radially from the member 228 into an axial groove formed in the tubular portion 224 so that while the member 228 can shift axially it cannot turn. A snap ring 232 engages the front face of the member 228 to limit the forward movement of the latter. A series of centrally apertured, dished springs 234 are housed within the tubular portion 224, freely surround the screw 226, and form a spring means which at its front end bears against the rear surface of the member 228. At its rear end, the spring means 234 bears against a washer 236 which also freely surrounds the screw 226 and which, in the illustrated position of the parts, bears against a shoulder of the tubular portion 224. A screw member 238, in the form of an axially bored plug is threadedly carried by the tubular portion 224 at its rear end, and by turning the adjusting screw 238 it is possible to determine the axial position of the washer 236 so as to adjust the compression of the spring means 234, and in this way it is possible to adjust the force of the energy-storing or spring means which resists the rearward movement of the head 138. The screw 226 passes freely through the axial bore of the adjusting screw 238 so that it is possible to turn the screw 226 independently of the screw 238 and in this way it is possible to determine the axial position of the piston 194 in the rest position of the parts. The screw 226 has a rear non-circular end portion 240 adapted to be engaged by a suitable wrench so that the operator can adjust the axial position of the screw 226 by turning the latter with respect to the threaded bore of the front member 228. The adjusting screw 238 also has a non-circular portion adapted to be engaged by a wrench so that it is possible for the operator to adjust the screw 238, and in addition the screw 238 has a collar 242 provided with a suitable scale which cooperates with an index portion 244 or the like at the rear end of the tubular portion 224, so that the operator can visually adjust the spring means 234 with the use of this scale.

The shiftable head 138 will move rearwardly from its rest position shown in FIG. 8 through a predetermined distance before the surface 208 engages the shoulder 206. By adjusting the screw 226 it is possible to determine what fraction of the rearward movement of the head 138 is initially required to place the jaws 150 in engagement with the workpiece, while with the adjusting screw 238 it is possible to determine the final gripping pressure which is applied against the work by the jaws 150 during the remainder of the rearward movement of the head 138 after the jaws 150 have engaged the workpiece. Thus, it will be seen that with the parts in the position shown in FIG. 8 the operator can simply turn the screw 226 so as to determine the axial position of the piston 194 in the cylinder 192, and in this way the volume of hydraulic liquid in the several chambers 180 will be determined so that in this way the initial positions of the gripping jaws relative to the workpiece is determined. Thus, it is possible to adjust in this way the point, during the return or rear movement of the head 138, at which the workpiece will be engaged by the jaws 150. Thus, the gripping jaws will engage the workpiece before the front end of the indicating means 204 is flush with the front face 216 of the plate 162. Before the chuck is operated the operator will have preset the adjusting screw 238 so as to provide a predetermined initial compression in the spring means 234, and this initial compression is such that during the continued rearward movement of the head 138 after the jaws grip the work the pressure of the hydraulic liquid will be increased to an extent sufficient to provide the necessary gripping force. Thus, the adjustment provided by the screw 238 determines the ultimate force with which the jaws 150 grip the work, while the adjustment provided by the screw 226 determines the extent of initial rearward movement of the head 138 required to place the jaws 150 in engagement with the work.

Of course, when the tailstock has been moved toward the headstock by a distance sufficient to advance the workpiece and the shiftable head 138 until the latter reaches its rear end position, the operator will lock the tailstock in this position and the work will of course remain engaged by the chuck so as to turn therewith until the operator again moves the tailstock away from the headstock. This operation is true of all of the embodiments of the invention.

It should be noted that the portion 140 of the head 138 carries a covering cylinder 250 which extends from the portion 140 all the way up to the outer periphery of the support means 130 when the shiftable head 138 is in its forward rest position, so that in this way the space between the support means 130 and the shiftable head 138 is covered and protected from foreign matter and the like.

Figure 10:
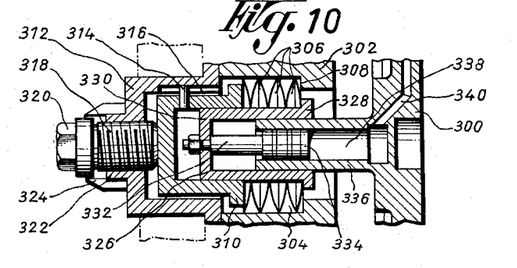
FIG. 10 is a fragmentary axial sectional view illustrating another embodiment of a structure for hydraulically actuating the gripping jaws during rearward movement of the shitfable head of the chuck of the invention.

In the embodiment of the invention which is illustrated in FIG. 10, the portion 300 of the shiftable head carries an unillustrated hollow cylindrical portion which surrounds the outer periphery of the support means 302 which is also fixed to a rotary part of the headstock to rotate therewith, and through a suitable key and keyway, the shiftable head is axially movable relative to the support means 302 while being constrained to rotate therewith. The support means 302 is formed with a stepped bore 304 which receives the series of centrally apertured, dished springs 306 which engage a shoulder 308 of the bore 304, and the other end of the spring means 306 bears against a front flange of an axially shiftable tubular member 310 which is provided with a radially extending pin 314 extending into an axial groove 316 of a tubular housing 312 which is fixed to and extends rearwardly from the support means 302, so that in this way the sleeve 310 can move axially but cannot turn relative to the housing 312. The axial position of the sleeve 310 can be adjusted therein by an adjusting screw 318 threadedly carried by the housing 312 at its rear end, and the adjusting screw 318 has a non-circular free end portion to which a wrench may be applied for turning the screw 318. The screw 318 carries a collar 320 provided with a scale which cooperates with an index carried by a sleeve 324, so that the operator may by inspecting the scale determine the axial position of the adjusting screw 318, and of course adjustment of the screw 318 will determine the axial position of the sleeve 310 and the compression of the springs 306 between the front flange of the sleeve 310 and the shoulder 308, so that the screw 318 serves to set the extent to which the springs 306 are compressed.

A tube 326 is axially slidable in the sleeve 310, and the tube 326 has a front flange 328 which engages the spring means 306 in the manner shown in FIG. 10. The tube 326 slidably surrounds the rearwardly extending cylindrical portion 336 of the shiftable head 300, and this portion 336 is axially bored so as to form a cylinder 338 which receives the piston 334 which is fixed by the piston rod 332 to the rear wall 330 of the tube 326. The interior of the cylinder 338 communicates through the bores 340, one of which is shown in FIG. 10, with the several piston-and-cylinder means, respectively, which carry the gripping jaws so that in this way the hydraulic liquid in the cylinder 338 can be displaced to the several piston-and-cylinder means for moving the gripping jaws radially with respect to the axis of the chuck toward or away from the workpiece in the manner described above in connection with FIG. 8, for example. Thus, with the embodiment of FIG. 10 it is possible by adjusting the screw 318 to determine the pressure in the hydraulic fluid at which the spring means 306 will yield permitting the tube 326 to move rearwardly with the piston 334, so that in this way with the embodiment of FIG. 10 it is possible to adjust the maximum pressure of the hydraulic fluid and thus the maximum force with which the jaws grip the workpiece. Of course, there will be an initial movement of the shifting head 300 rearwardly in order to place the jaws in engagement with the work, and then during the continued rearward movement the pressure will build up until the pressure reaches the value determined by the setting of the screw 318 at which the springs 306 will yield and the tube 328 will move rearwardly together with the piston 334. Because of the fact that with the embodiment of FIG. 10 the springs 306 are housed within the stepped bore 304 which is formed directly within the support means 302 itself, this assembly occupies a far smaller axial distance than in the case of the assembly of FIG. 8, for example. Otherwise the embodiment of FIG. 10 may be identical with that of FIG. 8, for example. Thus, there will be a stop means similar to that of FIG. 8 which limits the return movement of the shiftable head 300, and of course there will also be a spring which urges the shiftable head forwardly, although in this case when the shiftable head reaches the end of its forward movement it will simply stop and there will not necessarily be any structure preventing further forward movement of the shifting head. In this case the shifting head will simply remain at the end of its forward travel when it reaches its rest position.

It should be noted that while the embodiments of FIGS. 1–7 and FIG. 10 do not include a stop for mechanically and positively limiting the forward movement of the shiftable head, as is the case with FIG. 8 where the flange 190 acts as a stop to limit forward movement of the head, nevertheless it is not possible for the shiftable heads of the embodiment of FIGS. 1–7 and the embodiment of FIG. 10 to move forwardly all the way so as to become separated from the rest of the assembly since if the head is moved forward sufficiently the closed hydraulic circuit will by suction advance the gripping jaws to the end of their possible movement away from the axis of the chuck, and then because the hydraulic circuit is closed further forward movement of the shifting head is not possible.

Figure 11:
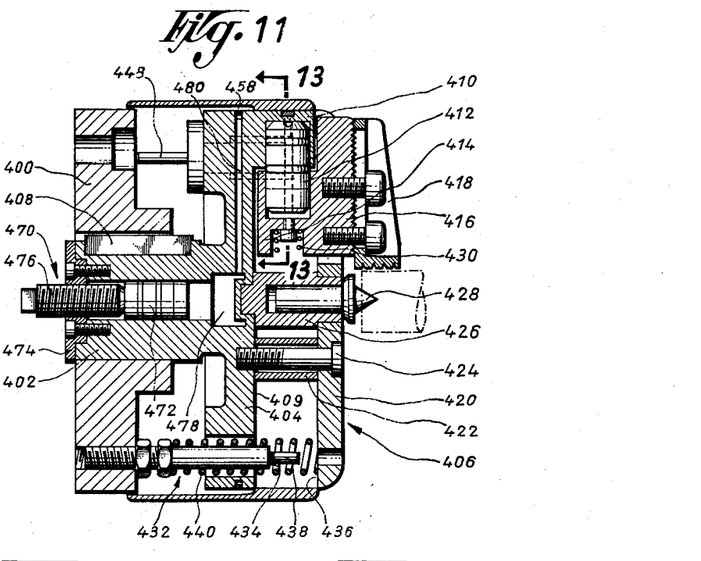
FIG. 11 is an axial sectional view illustrating yet another embodiment of a chuck according to the present invention.
Figure 12:
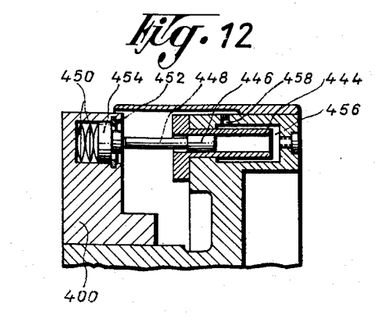
FIG. 12 is a fragmentary sectional view, taken along line 12—12 of FIG. 13 and showing part of the hydraulic means of the embodiment of FIGS. 11–13.
Figure 13:
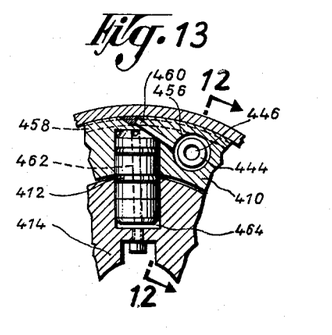
FIG. 13 is a fragmentary sectional view taken along line 13—13 of FIG. 11 and showing a piston-and-cylinder means of this embodiment as well as part of the hydraulic means cooperating therewith.

A further embodiment of the invention is illustrated in FIGS. 11–13. Referring to FIG. 11 it will be seen that the chuck of this embodiment includes a support means 400 which is adapted to be fixed, in the manner described above in connection with the support means of the other embodiments of the invention, to a rotary part of the headstock so as to rotate therewith whenever the machine tool is operated, and of course the support means 400 is coaxial with the rotary part of the headstock to which it is fixed. The support means 400 is formed with an axial bore passing therethrough and this axial bore receives the cylindrical portion 402 which extends rearwardly from the portion 404 of the shiftable head 406 of the chuck of FIG. 11. The rear cylindrical extension 402 of the shiftable head 406 has a sliding fit in the cylindrical bore of the support means 400, and the cylindrical portion 402 carries a key 408 which slides in an axial keyway formed at the inner periphery of the support means 400, so that while the head 406 can shift axially with respect to the support means 400, this head 406 is constrained to rotate with the support means 400. The portion 404 of the shiftable head 406 is provided at its periphery with a plurality of forwardly extending projections 410 the number of which corresponds to the number of gripping jaws, and these projections 410 are uniformly distributed about the axis of the chuck. The projections 410 respectively carry fixedly the pistons 412 of a plurality of piston-and-cylinder assemblies which respectively are connected to the gripping jaws of the chuck. The several pistons 412 extend radially with respect to the axis of the chuck, and they are respectively received in cylindrical bores of the plurality of cylinder blocks 416, the pistons 412 respectively having a sliding fit in these cylindrical bores, and of course this fit is fluid-tight so that the cylindrical bores which form the cylinders of the plurality of piston-and-cylinder means can retain the fluid under pressure which is necessary to apply the gripping jaws to the work with the required pressure. The cylinder blocks 414 are respectively provided with jaw-carrier portions 416 to which the gripping jaws 418 are respectively fixed by screws, as indicated at the upper right portion of FIG. 11, and it will be noted that the connection of the jaws 418 to the jaw-carrier portions 416 is adjustable in the same way as was described above in connection with FIG. 8. The several cylinder blocks 414 are guided for radial movement toward and away from the axis of the chuck by a plate 420 which may be identical with the plate 162 of FIG. 8 and which is formed in the same way with radial notches the edges of which respectively extend into guiding grooves formed in the opposed faces of each cylinder block, as is shown particularly in FIG. 9, and in the same way the structure of FIG. 11 is made to guide the several cylinder blocks for movement together with the gripping jaws radially toward and away from the axis of the chuck. Also, as was the case with the embodiment of FIG. 8, screws 424 serve to fixe the guide plate 420 to the portion 404 of the shiftable head 406, and these screws 424 respectively pass through spacer sleeves 422 which determine the distance between the plate 420 and the front face 409 of the portion 404 of the head 406. A tubular center carrier 426 is also arranged between the portion 404 of the head 406 and the plate 420, and this center-carrier 426 has the same construction as the center-carrier 174 of FIG. 8, and also the center 428 which is slidably received in the carrier 426 may be identical with the center 170 of FIG. 8. Thus, the operator can at any time remove the center 428 from the carrier 426 and replace it with another center, if desired. Springs 430, which correspond to and may be identical with the springs 184 of FIG. 8, press at their inner ends against the center-carrier 426 and at their outer ends against the inner end walls of bores which are formed in the several cylinder blocks 414, respectively, so that these springs 430 act to move the cylinder blocks 414 away from the axis of the chuck, in the same way as the springs 184 of FIG. 8.

As may be seen from FIG. 11, there is located adjacent to the outer periphery of the chuck a stop means 432 which is adjustable. This stop means 432 is in the form of an elongated member extending parallel to the axis of the chuck and threadedly carried by the support means 400, a suitable lock nut fixing the adjusted axial position of the stop means 432, and the same is true of the stop means 202 of FIG. 8 which has a construction similar to that of the stop means of FIG. 11. The elongated threaded member which forms the stop means 432 of FIG. 11 carries at its front end an elongated indicating means 438 which is of a reduced diameter as compared to the remainder of the stop means 434, and at the junction between the indicating means 438 and the remainder of the elongated threaded member is a forwardly directed stop shoulder 434 which is adapted to be engaged by the rear face 436 of the plate 420 in order to determine the rear end position of the shiftable head 406. The indicating means 438 is coaxially aligned with a bore which passes through the plate 420 and which receives the indicating means 438 during rearward movement of the head 406, and when the rear face 436 of the plate 420 engages the stop shoulder 434, the front end of the indicating means 438 is flush with the front face of the plate 420, so that the operator knows in this way that the shiftable head 406 has reached the end of its rearward movement toward the support means 400. A spring 440 is coiled about the elongated stop means 432, and the rear end of this spring 440 bears against a nut which is carried by a threaded portion of the stop means 432, while the forward end of the spring 440 bears against the face 436, so that the spring 440 urges the shiftable head 406 to its forward position shown in FIG. 11.

The embodiment of FIGS. 11–13 also includes a hydraulic means which cooperates with the several piston-and-cylinder means to actuate the jaws which are respectively carried by the piston-and-cylinder means, and in the embodiment of FIGS. 11–13 there is a separate cylinder-and-piston assembly for each piston-and-cylinder means which carries a gripping jaw. In other words there is in the embodiment of FIGS. 11–13 a number of piston-and-cylinder assemblies forming part of the hydraulic means and equalling the number of and respectively cooperating with the piston-and-cylinder means which respectively carry the gripping jaws. The several piston-and-cylinder assemblies of the hydraulic means are respectively located directly adjacent to the several piston-and-cylinder means which are respectively connected to the gripping jaws 418 and the piston-and-cylinder assemblies of the hydraulic means respectively cooperate only with those piston-and-cylinder means which they are located nearest to. The several piston-and-cylinder assemblies of the hydraulic means are respectively carried by the projections 410 of the portion 404 of the head 406. Each of these assemblies includes, as shown in FIGS. 12 and 13, a cylinder 444 which is inserted into a suitable recess 456 formed at each projection 410, as shown most clearly in FIG. 12, and the several cylinders 444 which are respectively carried in this way by the several projections 410 in the recesses 456 thereof respectively receive the pistons 446, and of course the cylinders 444 and the pistons 446 are respectively slidable one with respect to the other. The several pistons 446 fixedly carry piston rods 448 which extend rearwardly into engagement with the front members 454 of a plurality of energy-storing or spring means which are respectively aligned with the several cylinders 444. The support means 400 is formed with recesses which respectively receive the plurality of series of dished springs 450 which respectively urge the members 454 forwardly into engagement with the plurality of snap rings 452, respectively, and it will be noted that the member 454 is shown in its forwardmost position in FIG. 12. Thus, during rearward movement of the head 406 the springs 450 will resist rearward movement of the piston 446 until the hydraulic liquid reaches a predetermined pressure and then this spring 450 will yield, so that in this way with the embodiment of FIGS. 11–13 there is also provided a secure gripping force. The portion 404 of the shiftable head 406 is formed at its outer periphery with an annular groove 458 which provides communication between all of the oil chambers 456. Moreover, as is apparent from FIG. 13, the several chambers 456 respectively communicate with the spaces which surround the outer ends of the pistons 412 through the several passages 460, respectively. These pistons 412 are formed at their outer ends with transverse grooves communicating with the passages which surround the outer ends of the pistons 412, and from this transverse groove the oil can flow along the axial grooves 462 of the several pistons 412. From these axial grooves 462 the oil can reach the several cylindrical chambers 464 formed in the cylinder blocks 414 and respectively receiving the several pistons 412 in a fluid-tight manner as described above.

When a workpiece is placed with one of its ends in engagement with the center 428 and with its other end in engagement with the center of the tailstock, and the tailstock is advanced toward the headstock, the head 406 will shift toward the support means 400, but the pistons 446 will remain stationary during the initial rearward movement of the head 406 so that oil will be displaced out of the several chambers 456 respectively through the conduits 460 and through the bores 462 of the pistons 412 into the cylinders 464 so as to displace the several cylinder blocks 414 in opposition to the springs 430 toward the axis of the chuck, and in this way the jaws 418 will engage the work. Then the continued force applied to the shiftable head 406 urging the latter toward the support means 400 will cause the pressure of the oil to increase so that the jaws grip the work with an increased force, and when the pressure of the oil equals that exerted by the springs 450, these springs will yield and the members 454 as well as the pistons 446 can then move rearwardly so as to maintain the pressure of the oil on the jaws on the work while the head 406 continues to advance rearwardly until the rear face 436 of the plate 420 engages the stop shoulder 434.

With the embodiment of FIGS. 11–13, as with the other embodiments of the invention, because the several cylinders of the several piston-and-cylinder means which carry the gripping jaws all communicate with each other there will be an automatic adjusting of the several gripping jaws with respect to the work, even if the work has a non-circular cross section. Thus, if outer peripheral portions of the work are located at different distances from the axis of the chuck, then when the shiftable head thereof is moved rearwardly some, but not all, of the gripping jaws will initially engage the work and then the continued rearward movement of the shiftable head will only result in movement of that gripping jaw, or those two gripping jaws, which do not yet engage the work into engagement with the work, and then the pressure will be equalized among all of the gripping jaws during the continued rearward movement of the head with the increase in the hydraulic pressure as described above. However, under certain circumstances the extent of rearward movement of the shiftable head required to bring all of the gripping jaws into engagement with the work where the outer periphery of the latter is non-circular may be too great, so that it may be desirable to be able to shift into engagement with such a non-circular workpiece the several jaws without necessarily providing too great of a rearward movement of the shiftable head before all of the jaws engage such a workpiece. The embodiment of FIG. 11 enables this result to be achieved. It will be noted that this embodiment includes an axial bore formed in the rear extension 402 of the head 406, and this axial bore of the cylindrical extension 402 communicates with the chamber 478 which in turn communicates with a radial bore 480 which communicates with the annular groove 458 which communicates with all of the chambers 456, as described above. A piston 472 is slidable in the cylindrical bore of the rear extension 402 of the shiftable head 406. A plate 474 is fixed as by screws to the rear of the cylindrical extension 402, and this plate 474 is formed with a threaded bore which is coaxial with the piston 472 and which receives the adjusting screw 476. The assembly 470 forms a means for positioning the jaws so that they will engage a workpiece irrespective of the cross sectional configuration thereof. Thus, assuming that a non-circular workpiece is placed in engagement with the center 428 and the head 406 is shifted rearwardly until one or two gripping jaws engage the workpiece while the third gripping jaw still has to move further toward the axis of the chuck in order to engage the workpiece, then without further rearward movement of the shiftable head 406 the operator can turn the screw 476 so as to advance the piston 472 to the right, as viewed in FIG. 11, so as to decrease the volume of the chamber 478 so that the hydraulic fluid will flow only to that cylindrical chamber 464 which is formed in the block 414 which carries a jaw which still has not engaged the work. The other jaws because they are in engagement with the work of course will not move and in this way the fluid is simply displaced automatically so as to move the remaining jaw, or the remaining two jaws in some cases, up to the work, by advancing of the piston 472 in the above-described manner, and then when all of the jaws have engaged the work the continued rearward movement of the shiftable head 406 will provide uniform clamping of the work in the jaws, and thus axial movement of the shiftable head 406 itself is not required in this case to compensate for variable distances between the jaws and the exterior surfaces of the workpiece respectively engaged thereby. It should be noted that the same result can be produced with the embodiment of FIGS. 1-7 through displacement of the pistons 93 in the cylindrical bores 92.

If desired, the cylindrical bore of the extension 402 may have a series of dished springs located between the screw 476 and the piston 472 so that the maximum pressure which can be provided in the hydraulic liquid through the screw 476 can be limited in this way. The spring assembly placed between the screw 476 and the piston 472 can be of such a force that it will yield when the pressure of the hydraulic liquid reaches a certain value, so that in this way increased pressure beyond this predetermined value can be limited.

It will be understood that each of the elements described above, or two or more together, may also find a useful application in other types of machine tools differing from the types described above.

While the invention has been illustrated and described as embodied in chucks, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a chuck, in combination, support means adapted to be fixed to a rotary part of a headstock of a machine tool for rotation therewith; a shiftable head located forwardly of said support means and supported by said support means for axial shifting movement relative thereto while being constrained by said support means to rotate therewith; a plurality of gripping jaws distributed about the axis of rotation of said shiftable head; a plurality of piston-and-cylinder means carried by said head and carrying said jaws, respectively, for moving the latter radially toward and away from said axis; and hydraulic means carried by said head, communicating with said plurality of piston-and-cylinder means, and responding to movement of said head axially toward said support means for actuating said plurality of piston-and-cylinder means for moving said jaws toward said axis, whereby when a workpiece engages said head and moves the latter toward said support means, the jaws will automatically advance toward and grip the workpiece.

2. In a chuck, in combination, support means adapted to be fixed to a rotary part of a headstock of a machine tool for rotation therewith; a shiftable head located forwardly of said support means and supported by said support means for axial shifting movement relative thereto while being constrained by said support means to rotate therewith; a plurality of gripping jaws distributed about the axis of rotation of said shiftable head; a plurality of piston-and-cylinder means carried by said head and carrying said jaws, respectively, for moving the latter radially toward and away from said axis; hydraulic means carried by said head, communicating with said plurality of piston-and-cylinder means, and responding to movement of said head axially toward said support means for actuating said plurality of piston-and-cylinder means for moving said jaws toward said axis, whereby when a workpiece engages said head and moves the latter toward said support means, the jaws will automatically advance toward and grip the workpiece; and a center carried by said shiftable head coaxially therewith to be engaged by the workpiece, so that when the workpiece is engaged between the latter center and a center of the tailstock during movement of the latter toward said head, the head will be moved toward said support means to produce automatic gripping of the workpiece by said jaws.

3. In a chuck, in combination, support means adapted to be fixed to a rotary part of a headstock of a machine tool for rotation therewith; a shiftable head located forwardly of said support means and supported by said support means for axial shifting movement relative thereto while being constrained by said support means to rotate therewith; a plurality of gripping jaws distributed about the axis of rotation of said shiftable head; a plurality of piston-and-cylinder means carried by said head and carrying said jaws, respectively, for moving the latter radially toward and away from said axis; hydraulic means carried by said head, communicating with said plurality of piston-and-cylinder means, and responding to movement of said head axially toward said support means for actuating said plurality of piston-and-cylinder means for moving said jaws toward said axis, whereby when a workpiece engages said head and moves the latter toward said support means, the jaws will automatically advance toward and grip the workpiece; and energy-storing means carried by said support means and cooperating with said hydraulic means for opposing shifting of said head toward said support means for determining the pressure with which said hydraulic means acts on said piston-and-cylinder means.

4. In a chuck, in combination, support means adapted to be fixed to a rotary part of a headstock of a machine tool for rotation therewith; a shiftable head located forwardly of said support means and supported by said support means for axial shifting movement relative thereto while being constrained by said support means to rotate therewith; a plurality of gripping jaws distributed about the axis of rotation of said shiftable head; a plurality of piston-and-cylinder means carried by said head and carrying said jaws, respectively, for moving the latter radially toward and away from said axis; hydraulic means carried by said head, communicating with said plurality of piston-and-cylinder means, and responding to movement of said head axially toward said support means for actuating said plurality of piston-and-cylinder means for moving said jaws toward said axis, whereby when a workpiece engages said head and moves the latter toward said support means, the jaws will automatically advance toward and grip the workpiece; and stop means carried in part by said support means and in part by said head for limiting the movement of said head axially toward said support means.

5. In a chuck, in combination, support means adapted to be fixed to a rotary part of a headstock of a machine tool for rotation therewith; a shiftable head located forwardly of said support means and supported by said support means for axial shifting movement relative thereto while being constrained by said support means to rotate therewith; a plurality of gripping jaws distributed about the axis of rotation of said shiftable head; a plurality of piston-and-cylinder means carried by said head and carrying said jaws, respectively, for moving the latter radially toward and away from said axis; hydraulic means carried by said head, communicating with said plurality of piston-and-cylinder means, and responding to movement of said head axially toward said support means for actuating said plurality of piston-and-cylinder means for moving said jaws toward said axis, whereby when a workpiece engages said head and moves the latter toward said support means, the jaws will automatically advance toward and grip the workpiece; and stop means carried in part by said support means and in part by said head for limiting the movement of said head axially toward said support means, said stop means being adjustable so that the limiting position of said head when the latter is shifted toward said support means is adjustable.

6. In a chuck, in combination, support means adapted to be fixed to a rotary part of a headstock for rotation therewith; a shiftable head coaxial with and located forwardly of said support means, said support means supporting said shiftable head for axial shifting movement with respect to said support means while constraining said head to rotate with said support means; a plurality of gripping jaws distributed about the common axis of said support means and head; a plurality of piston-and-cylinder means carried by said head and carrying said jaws, respectively, for moving the latter toward and away from said axis; hydraulic means cooperating with said plurality of piston-and-cylinder means for actuating the latter to move said jaws toward said axis upon shifting movement of said head toward said support means, said hydraulic means including at least one cylinder carried by said head and a piston slidable in said cylinder and extending rearwardly therefrom; and energy-storing means carried by said support means and engaging said piston during rearward movement of said head toward said support means for providing movement of said head rearwardly with respect to said piston whereby there is movement of said cylinder of said hydraulic means rearwardly with respect to said piston for actuating said hydraulic means to provide through said plurality of piston-and-cylinder means movement of said jaws toward said common axis, said energy-storing means opposing the force of said hydraulic means for determining the pressure with which a workpiece which engages said head is gripped by said jaws.

7. In a chuck, in combination, support means adapted to be fixed to a rotary part of a headstock for rotation therewith; a shiftable head coaxial with and located forwardly of said support means, said support means supporting said shiftable head for axial shifting movement with respect to said support means while constraining said head to rotate with said support means; a plurality of gripping jaws distributed about the common axis of said support means and head; a plurality of piston-and-cylinder means carried by said head and carrying said jaws, respectively, for moving the latter toward and away from said axis; hydraulic means cooperating with said plurality of piston-and-cylinder means for actuating the latter to move said jaws toward said axis upon shifting movement of said head toward said support means, said hydraulic means including at least one cylinder carried by said head and a piston slidable in said cylinder and extending rearwardly therefrom; and energy-storing means carried by said support means and engaging said piston during rearward movement of said head toward said support means for providing movement of said head rearwardly with respect to said piston whereby there is movement of said cylinder of said hydraulic means rearwardly with respect to said piston for actuating said hydraulic means to provide through said plurality of piston-and-cylinder means movement of said jaws toward said common axis, said energy-storing means opposing the force of said hydraulic means for determining the pressure with which a workpiece which engages said head is gripped by said jaws, said cylinder and piston of said hydraulic means being coaxial with said head and support means.

8. In a chuck, in combination, support means adapted to be fixed to a rotary part of a headstock for rotation therewith; a shiftable head located forwardly of said support means coaxially therewith, said support means supporting said head for shiftable axial movement relative to said support means while constraining said head to rotate with said support means; a plurality of gripping jaws distributed about the common axis of said support means and head; a plurality of piston-and-cylinder means carried by said head and carrying said jaws for moving the latter radially toward and away from said axis; hydraulic means cooperating with said plurality of piston-and-cylinder means for actuating the same to move said jaws radially toward said axis during rearward movement of said head toward said support means, said hydraulic means including a plurality of cylinders carried by said head, equal to the number of said piston-and-cylinder means, respectively having parallel axes which are distributed about and parallel to the common axis of said support means and head, and a plurality of pistons respectively located in said cylinders of said hydraulic means and extending rearwardly therefrom; and a plurality of energy-storing means carried by said support means and respectively engaging said pistons during rearward movement of said head toward said support means for providing rearward movement of said cylinders of said hydraulic means with respect to said pistons while the latter are engaged by said plurality of energy-storing means, respectively, so that said plurality of energy-storing means respectively oppose the movement of said head toward said support means for determining the pressure of the hydraulic means and thus of the jaws against a workpiece engaged thereby.

9. In a chuck, in combination, support means adapted to be fixed to a rotary part of a headstock for rotation therewith; a shiftable head coaxial with and located forwardly of said support means, said support means supporting said shiftable head for axial shifting movement with respect to said support means while constraining said head to rotate with said support means; a plurality of gripping jaws distributed about the common axis of said support means and head; a plurality of piston-and-cylinder means carried by said head and carrying said jaws, respectively, for moving the latter toward and away from said axis; hydraulic means cooperating with said plurality of piston-and-cylinder means for actuating the latter to move said jaws toward said axis upon shifting movement of said head toward said support means, said hydraulic means including at least one cylinder carried by said head and a piston slidable in said cylinder and extending rearwardly therefrom; energy-storing means carried by said support means and engaging said piston during rearward movement of said head toward said support means for providing movement of said head rearwardly with respect to said piston whereby there is movement of said cylinder of said hydraulic means rearwardly with respect to said piston for actuating said hydraulic means to provide through said plurality of piston-and-cylinder means movement of said jaws toward said common axis, said energy-storing means opposing the force of said hydraulic means for determining the pressure with which a workpiece which engages said head is gripped by said jaws; and adjusting means cooperating with said energy-storing means for adjusting the force with which said energy-storing means resists rearward movement of said head.

10. In a chuck, in combination, support means adapted to be fixed to a rotary part of a headstock for rotation therewith; a head coaxial with and located forwardly of said support means, said support means supporting said head for axial shifting movement relative to said support means while constraining said head to rotate with said support means; a plurality of gripping jaws distributed about the common axis of said support means and head; a plurality of piston-and-cylinder means carried by said head and carrying said jaws, respectively, for moving the latter toward and away from said axis; hydraulic means communicating with said plurality of piston-and-cylinder means for actuating the latter, said hydraulic means including at least one cylinder carried by said head and a piston slidable in said cylinder and extending rearwardly therefrom; and spring means carried by said support means in the path of rearward movement of said piston for engaging the latter during rearward movement of said head toward said support means to provide rearward movement of said head and said cylinder of said hydraulic means therewith relative to said piston, whereby said spring means opposes rearward movement of said head and determines the pressure with which said hydraulic means acts on said plurality of piston-and-cylinder means so as to determine the pressure with which said jaws engage a workpiece which engages said head during rearward movement thereof to be gripped by said jaws.

11. In a chuck, in combination, support means adapted to be fixed to a rotary part of a headstock for rotation therewith; a head coaxial with and located forwardly of said support means, said support means supporting said head for axial shifting movement relative to said support means while constraining said head to rotate with said support means; a plurality of gripping jaws distributed about the common axis of said support means and head; a plurality of piston-and-cylinder means carried by said head and carrying said jaws, respectively, for moving the latter toward and away from said axis; hydraulic means communicating with said plurality of piston-and-cylinder means for actuating the latter, said hydraulic means including at least one cylinder carried by said head and a piston slidable in said cylinder and extending rearwardly therefrom; and spring means carried by said support means in the path of rearward movement of said piston for engaging the latter during rearward movement of said head toward said support means to provide rearward movement of said head and said cylinder of said hydraulic means therewith relative to said piston, whereby said spring means opposes rearward movement of said head and determines the pressure with which said hydraulic means acts on said plurality of piston-and-cylinder means so as to determine the pressure with which said jaws engage a workpiece which engages said head during rearward movement thereof to be gripped by said jaws, and adjusting means cooperating with said spring means for adjusting the force in which the latter resists rearward movement of said head.

12. In a chuck, in combination, support means adapted to be fixed to a rotary part of a headstock for rotation therewith; a head located in front of said support means coaxially therewith, said support means supporting said head for axial shifting movement relative to said support means while constraining said head to rotate with said support means; a plurality of gripping jaws distributed about the axis of said head; a plurality of piston-and-cylinder means carried by said head and respectively carrying said jaws for moving the latter radially toward and away from said axis; hydraulic means carried by said head, communicating with said plurality of piston-and-cylinder means, and responding to rearward movement of said head toward said support means for actuating said plurality of piston-and-cylinder means to move said plurality of jaws radially toward said axis; stop means carried in part by said support means and in part by said head for limiting the rearward movement of the latter with respect to said support means; and indicating means cooperating with said stop means for indicating when said head has reached the end of its rearward movement relative to said support means.

13. In a chuck, in combination, support means adapted to be fixed to a rotary part of a headstock for rotation therewith; a head located in front of said support means coaxially therewith, said support means supporting said head for axial shifting movement relative to said support means while constraining said head to rotate with said support means; a plurality of gripping jaws distributed about the axis of said head; a plurality of piston-and-cylinder means carried by said head and respectively carrying said jaws for moving the latter radially toward and away from said axis; hydraulic means carried by said head, communicating with said plurality of piston-and-cylinder means, and responding to rearward movement of said head toward said support means for actuating said plurality of piston-and-cylinder means to move said plurality of jaws radially toward said axis; stop means carried in part by said support means and in part by said head for limiting the rearward movement of the latter with respect to said support means; and indicating means cooperating with said stop means for indicating when said head has reached the end of its rearward movement relative to said support means, said indicating means being carried by said stop means and being visible at the front of said head when the latter has reached the limit of its rearward movement relative to said support means.

14. In a chuck, in combination, support means adapted to be fixed to a rotary part of a headstock for rotation therewith; a head located in front of said support means coaxially therewith, said support means supporting said head for axial shifting movement relative to said support means while constraining said head to rotate with said support means; a plurality of gripping jaws distributed about the axis of said head; a plurality of piston-and-cylinder means carried by said head and respectively carrying said jaws for moving the latter radially toward and away from said axis; hydraulic means carried by said head, communicating with said plurality of piston-and-cylinder means, and responding to rearward movement of said head toward said support means for actuating said plurality of piston-and-cylinder means to move said plurality of jaws radially toward said axis; stop means carried in part by said support means and in part by said head for limiting the rearward movement of the latter with respect to said support means; and indicating means cooperating with said stop means for indicating when said head has reached the end of its rearward movement relative to said support means, said indicating means being carried by said stop means and being visible at the front of said head when the latter has reached the limit of its rearward movement relative to said support means, said indicating means being in the form of an elongated pin carried by said stop means for axial shifting movement relative to said stop means, said pin being parallel to said axis and spring means urging said pin with respect to said stop means to a rear position where said pin is retracted from the front face of said head, said head upon rearward movement moving the part of the stop means carried by said head rearwardly with respect to said pin in opposition to said spring means to render said pin visible at the front face of said head when the latter has reached the end of its rearward movement relative to said stop means.

15. In a chuck, in combination, support means adapted to be fixed to a rotary part of a headstock of a machine tool for rotation therewith; a shiftable head located forwardly of said support means and supported by said support means for axial shifting movement relative thereto while being constrained by said support means to rotate therewith; a plurality of gripping jaws distributed about the axis of rotation of said shiftable head; a plurality of piston-and-cylinder means carried by said head and carrying said jaws, respectively, for moving the latter radially toward and away from said axis; and hydraulic means carried by said head, communicating with said plurality of piston-and-cylinder means, and responding to movement of said head axially toward said support means for actuating said plurality of piston-and-cylinder means for moving said jaws toward said axis, whereby when a workipece engages said head and moves the latter toward said support means, the jaws will automatically advance toward and grip the workpiece, said hydraulic means including a plurality of passages for hydraulic fluid formed in said head, and said head carrying at its outer periphery a covering ring which closes said passages at the outer periphery of said head.

16. In a chuck, in combination, support means adapted to be fixed to a rotary part of a headstock of a machine tool for rotation therewith; a shiftable head located forwardly of said support means and supported by said support means for axial shifting movement relative thereto while being constrained by said support means to rotate therewith; a plurality of gripping jaws distributed about the axis of rotation of said shiftable head; a plurality of piston-and-cylinder means carried by said head and carrying said jaws, respectively, for moving the latter radially toward and away from said axis; and hydraulic means carried by said head, communicating with said plurality of piston-and-cylinder means, and responding to movement of said head axially toward said support means for actuating said plurality of piston-and-cylinder means for moving said jaws toward said axis, whereby when a workpiece engages said head and moves the latter toward said support means, the jaws will automatically advance toward and grip the workpiece, said hydraulic means including a plurality of passages for hydraulic fluid formed in said head, and said head carrying at its outer periphery a covering ring which closes said passages at the outer periphery of said head, said passages including an annular passage communicating with the several cylinders of said plurality of piston-and-cylinder means, and said annular passage being closed by said ring.

17. In a chuck, in combination, support means adapted to be fixed to a rotary part of a headstock of a machine tool for rotation therewith; a shiftable head located forwardly of said support means and supported by said support means for axial shifting movement relative thereto while being constrained by said support means to rotate therewith; a plurality of gripping jaws distributed about the axis of rotation of said shiftable head; a plurality of piston-and-cylinder means carried by said head and carrying said jaws, respectively, for moving the latter radially toward and away from said axis; and hydraulic means carried by said head, communicating with said plurality of piston-and-cylinder means, and responding to movement of said head axially toward said support means for actuating said plurality of piston-and-cylinder means for moving said jaws toward said axis, whereby when a workpiece engages said head and moves the latter toward said support means, the jaws will automatically advance toward and grip the workpiece, said hydraulic means including a plurality of passages formed in said head and respectively communicating with cylinders of said plurality of piston-and-cylinder means.

18. In a chuck, in combination, support means adapted to be fixed to a rotary part of a headstock; a head coaxial with and located in front of said support means, said support means supporting said head for axial shifting movement relative to said support means while constraining said head to rotate with said support means; a plurality of gripping jaws distributed about said axis; a plurality of piston-and-cylinder means carried by said head; a plurality of connecting means at least indirectly connecting said plurality of jaws respectively to said plurality of piston-and-cylinder means to be moved by the latter radially toward and away from said axis; and hydraulic means responding to rearward shifting movement of said head toward said support means for actuating said plurality of piston-and-cylinder means to move said jaws radially toward said axis during rearward movement of said head relative to said support means.

19. In a chuck, in combination, support means adapted to be fixed to a rotary part of a headstock of a machine tool for rotation therewith; a shiftable head located forwardly of said support means and supported by said support means for axial shifting movement relative thereto while being constrained by said support means to rotate therewith; a plurality of gripping jaws distributed about the axis of rotation of said shiftable head; a plurality of piston-and-cylinder means carried by said head and carrying said jaws, respectively, for moving the latter radially toward and away from said axis; hydraulic means carried by said head, communicating with said plurality of piston-and-cylinder means, and responding to movement of said head axially toward said support means for actuating said plurality of piston-and-cylinder means for moving said jaws toward said axis, whereby when a workpiece engages said head and moves the latter toward said support means, the jaws will automatically advance toward and grip the workpiece; a center carried coaxially by said head for axial shifting movement relative thereto; and spring means cooperating with said center for urging the latter forwardly to a predetermined rest position where said center projects forwardly beyond said head, whereby a workpiece engaging said center will first move the latter rearwardly relative to said head in opposition to said spring means until said center reaches a rear end position whereupon the continued rearward movement of the workpiece will advance said head rearwardly relative to said support means to provide through said hydraulic means and said plurality of piston-and-cylinder means movement of said jaws toward the workpiece to grip the latter.

References Cited in the file of this patent

UNITED STATES PATENTS

| | | |
|---|---|---|
| 2,948,540 | Garberding | Aug. 9, 1960 |
| 2,980,432 | Benson | Apr. 18, 1961 |

FOREIGN PATENTS

| | | |
|---|---|---|
| 848,551 | Great Britain | Sept. 21, 1960 |
| 1,143,891 | France | Apr. 15, 1957 |